(No Model.)

R. T. WHITE.
ROUTING MACHINE.

No. 275,002. Patented Apr. 3, 1883.

Witnesses.
E. Planta.
Benj. P. Ryder.

Inventor
R. T. White
by J. H. Adams
Atty

UNITED STATES PATENT OFFICE.

REYNOLDS T. WHITE, OF BOSTON, MASSACHUSETTS.

ROUTING-MACHINE.

SPECIFICATION forming part of Letters Patent No. 275,002, dated April 3, 1883.

Application filed July 20, 1882. (No model.)

*To all whom it may concern:*

Be it known that I, REYNOLDS T. WHITE, of Boston, in the county of Suffolk and State of Massachusetts, have invented a new and useful Improvement in Routing-Machines, of which the following is a specification.

My invention relates to improvements in machines for cutting mortises, moldings, and rosettes in articles of wood.

The invention consists in the employment of a rotary cutter the spindle of which is supported in bearings on a frame which slides in grooves on the main frame, the rotary cutter being driven by a belt from an adjustable counter-shaft, the belt passing over adjustable tightening-pulleys. The article to be operated upon is placed on a table or support, which is moved backward and forward by means of a cog-wheel gearing into a rack on the under side of the table, so that when the cutter has bored the requisite depth the table can be moved along and a groove the required length is cut without raising or removing the cutter from the same. The sliding table is carried by a sliding frame, which is adjustable on the main frame by means of a screw.

Figure 1:
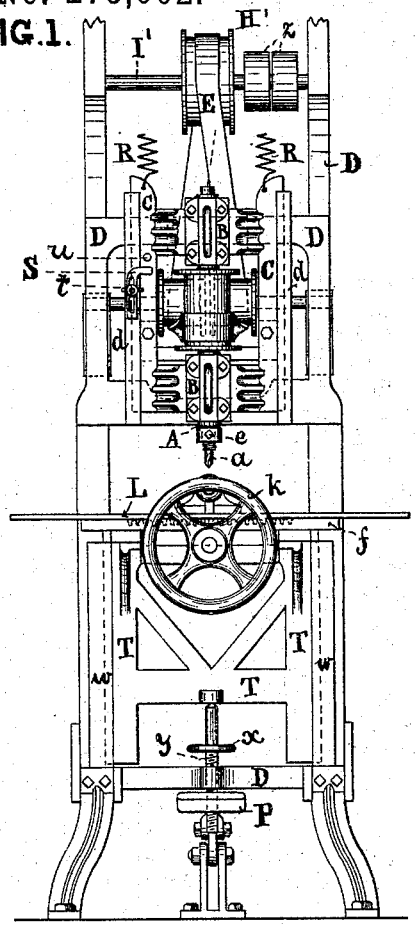
Figure 2:
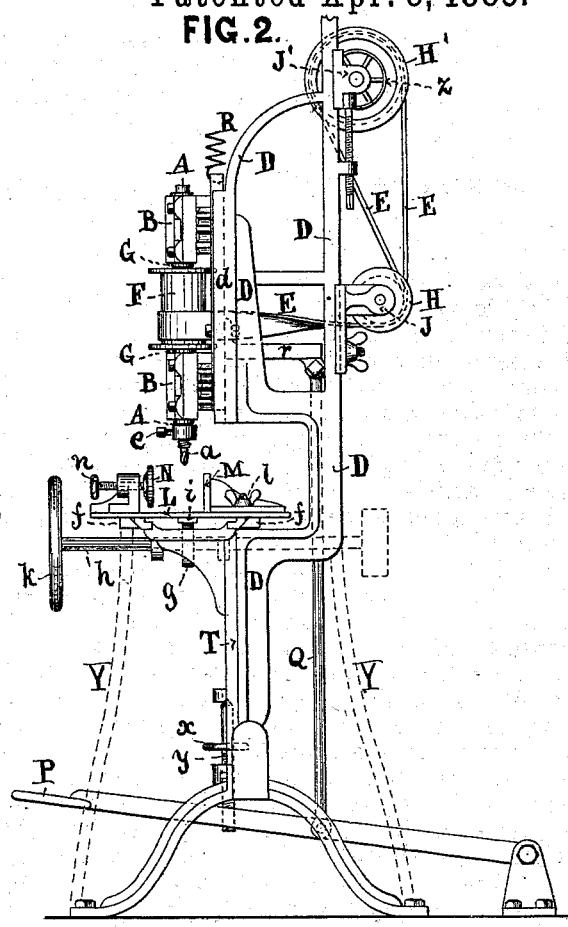
Figure 3:
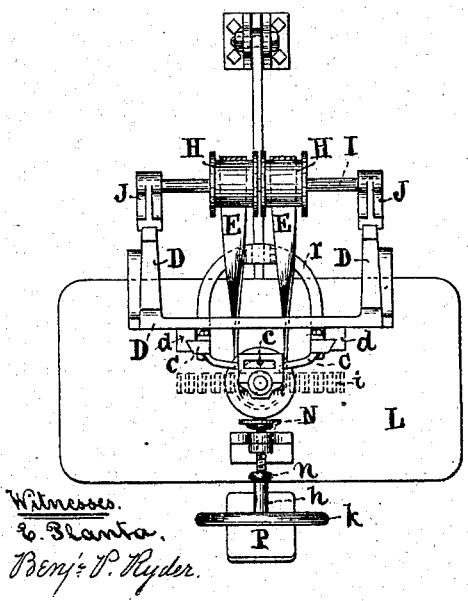

Figure 1 represents a front view of a machine embodying my invention. Fig. 2 is a side view of the same. Fig. 3 is a plan or top view taken below the counter-shaft.

*a* is a cutter secured in the spindle A, which has its bearings B on the vertically-sliding frame C, the sides of which are provided with beveled edges, which fit into the beveled slides *d* on the main frame D. The spindle A is provided at its lower end with a boss for the reception of the cutter or bit *a*, which is secured therein by the screw *e*. The boss is also provided with a screw-thread on the outside, upon which a rosette-cutter can be secured, and the spindle A is also made with collars G, to work inside the bearings B, so as to insure the cutter working steadily; or the collars can be fastened on instead of being formed in one with the spindle. The bearings B are formed with a hollow space, *c*, at the back, (see Fig. 3,) partially filled with cotton-waste which is saturated with oil, which percolates through small perforations to the journals of the spindle A, and thus keeps the journals constantly lubricated. The spindle A is also provided with a flanged pulley, F, and is driven by an endless belt, E, which passes over pulley F under loose pulleys H on shaft I, which latter is mounted in adjustable bearings J, secured to the back of the machine. The belt then passes from under pulleys H over pulley H' on the counter-shaft I', which is carried in the adjustable bearings J' at the back of the machine. The counter-shaft I' also carries the fast and loose driving-pulleys *z z*.

L is a table or support for the work to be operated upon, and has on the under side beveled pieces *f*, which fit over corresponding beveled pieces or sides on the frame T, on which the table slides. The frame T is made with beveled sides, which fit into corresponding beveled pieces, *w*, secured on the frame D, so that the frame T, and with it the table L, is made adjustable as to height, and is raised or lowered as desired (according to the thickness of material or the depth of cut required) by the hand-wheel *x* and screw *y*, which passes through a boss on the main frame D. The table L is moved forward and backward by means of a pinion, *g*, on the shaft *h* gearing into a rack, *i*, on the under side of the table, the shaft *h* being operated by a hand-wheel, *k*, or by power by means of the pulley shown in dotted lines.

On the top of the table L is a sliding guide, M, which is held in any desired position by means of set-screws *l*, and on the opposite side of the table is another guide, N, constituting a clamp, the screw of which passes through a boss on the table, and is provided with a hand-wheel, *n*, by turning which the clamp N can be caused to hold the work against the guide M.

The sliding frame C, carrying the spindle A and cutter *a*, is brought down to the material to be operated upon by means of a treadle, P, which is connected by a rod, Q, to an arm or bracket, *r*, on the back of the sliding frame C. The frame C is raised and kept in its normal position by means of springs R, attached to its upper ends and to a beam or ceiling above. The travel of the frame C is regulated by the stop S, which is adjusted by set-screw *t*, according to the depth the cutter is required to enter the material. A pin, *u*, on the sliding frame C, coming against the stop S, prevents the frame from descending below the required point.

The operation of the machine is as follows: The table L is adjusted in height by the hand-wheel $x$ and screw $y$, according to the thickness of the material to be operated upon, the stop S having been adjusted according to the depth of the slot to be bored. The material is then placed on the table L and held between the clamps M N. The machine is then started, and the treadle P being depressed, the bit $a$ enters the material the desired depth. The table L is then fed along by the hand-wheel $k$ until the desired length of slot has been cut, when the treadle is released, and the frame C is then drawn up by the springs R, the bit $a$ being thereby drawn out of the slot. The material is then taken out and another piece placed on the table L and the operation repeated, the hand-wheel $k$ being turned in the reverse direction, thus bringing the table back again. It will be seen that a slot is cut for each forward and each backward movement of the table.

When the machine is used as a rosette-cutter or variety molder, the clamps M N are removed, which leaves the table free, so as to take a large board or piece of material in which it is desired to cut the rosettes. The cutter is then brought down to its work by depressing the treadle, and when one rosette is cut the treadle is released and the cutter drawn up by the springs R. The board is then shifted, the treadle again depressed, and another rosette cut, and so on until the desired number has been cut.

In some cases I prefer to make the frame with stiffening-pieces Y Y, as shown in dotted lines, so as to insure the table L being steady.

What I claim as my invention is—

1. In a routing-machine, the rotating spindle A, carried in bearings B on sliding frame C, in combination with the pulley F, pulley H' on counter-shaft I', adjustable bearings J', and the tightening-pulleys H on shaft I, adjustable bearings J, and endless band E, substantially as and for the purpose shown and described.

2. In a routing-machine, the combination of the main frame D, frame C, adapted to slide vertically in suitable guides formed on the main frame, the rotating spindle A, carried in bearings attached to the sliding frame C and provided with a suitable cutter, adjustable frame T, sliding table L, supported thereon, and having means for clamping the work, treadle P, and connections for depressing the sliding frame, thereby bringing the cutter in contact with the work, and means for operating the cutter and sliding table, substantially as described.

3. In a routing-machine, the combination of the main frame D, adjustable frame T, hand-wheel $x$ and screw $y$ for imparting a vertical adjustment to said frame T, sliding table L, supported on said frame and having adjustable clamps M N, the sliding frame C, adapted to move in guides on the main frame, the cutter-spindle A, supported in bearings on the sliding frame C, a treadle, P, and connections for depressing the spindle-carrying frame, retracting-springs R, and mechanism for actuating the cutter-spindle and sliding table L, substantially as described.

4. In a routing-machine, the combination of the main frame D, vertically-sliding frames T and C, sliding table L, having means for clamping the work and provided with suitable operating mechanism, the cutter-spindle A, supported in bearings B on the frame C, and having a pulley, F, and collars G, the pulley H, supported in adjustable bearings J, and the adjustable counter-shaft I', having pulleys $z$ $z$ and H', substantially as shown and described.

In testimony whereof I have signed my name to this specification in the presence of two subscribing witnesses.

REYNOLDS T. WHITE.

Witnesses:
J. H. ADAMS,
E. PLANTA.